United States Patent [19]

Mitchell et al.

[11] Patent Number: 4,970,259

[45] Date of Patent: Nov. 13, 1990

[54] ELASTOMERIC FILM COMPOSITION

[75] Inventors: Neil F. Mitchell, Santa Barbara, Calif.; Lie K. Djiauw, Houston, Tex.

[73] Assignee: Shell Oil Company, Houston, Tex.

[21] Appl. No.: 394,611

[22] Filed: Aug. 16, 1989

[51] Int. Cl.$^5$ .......................... C08K 53/00; C08L 53/00
[52] U.S. Cl. .................................... 524/505; 524/481; 525/89; 525/99; 525/316
[58] Field of Search ........................ 524/505, 484, 487; 525/89, 99

[56] References Cited

U.S. PATENT DOCUMENTS

| | | | |
|---|---|---|---|
| 3,576,913 | 4/1971 | Johnson et al. | 260/880 |
| 3,686,365 | 8/1972 | Sequeira | 260/876 |
| 3,865,776 | 2/1975 | Gergen | 260/33.6 |
| 4,006,116 | 2/1977 | Dominguez | 260/33.6 |
| 4,017,436 | 4/1977 | Tabana et al. | 260/27 |
| 4,701,367 | 10/1987 | Malhotra | 428/216 |
| 4,769,415 | 9/1988 | Hotta et al. | 525/89 |

FOREIGN PATENT DOCUMENTS 254346 7/1987 European Pat. Off.
58-204037 11/1983 Japan.

OTHER PUBLICATIONS

Shell Chemical Sales Bulletin, dated Mar. 7, 1988.

Primary Examiner—Joseph L. Schofer
Assistant Examiner—Mark D. Sweet
Attorney, Agent, or Firm—Del S. Christensen

[57] ABSTRACT

A composition is provided which is suitable for extrusion blowing to form an elastomeric film. The film produced from this composition has a very low modulus, high elongation and excellent elastic recovery. The composition comprises: two hydrogenated block copolymers each comprising at least two blocks containing predominantly polymerized alkene arene monomer units and at least one block containing predominantly polymerized conjugated diene monomer units, the first hydrogenated block copolymer having a molecular weight between about 55,000 and about 200,000 and the second hydrogenated block copolymer having a molecular weight between about 15,000 and about 85,000, the ratio of the molecular weight of the first of the second being greater than 1.1:1, and each hydrogenated block copolymer being present in an amount of greater than 15 parts by weight for each 100 parts by weight of the total amount of the two hydrogenated block copolymers; between about 5 parts by weight and about 100 parts by weight of a polymer which is compatible with the polymerized vinyl arene blocks of the hydrogenated block copolymer; and between about 5 parts by weight and 200 parts by weight of a non-aromatic processing oil.

15 Claims, No Drawings

ELASTOMERIC FILM COMPOSITION

FIELD OF THE INVENTION

This invention relates to polymeric compositions which are useful as elastomeric films. In one aspect, the invention relates to an elastomeric composition which can be formed into a film by extrusion blowing.

BACKGROUND

Elastomeric films are used in products such as disposable diaper leg and waist bands and examination gloves. In the past, such elastomeric films have been made of elastomeric block copolymers, combinations of elastomeric block copolymers and liquid butadienes, combinations of elastomeric block copolymers and ethylene-vinyl acetate copolymers, thermoplastic urethanes, and combinations of copolyesters and ethylene-vinyl acetate copolymers. These materials have suitable properties for elastomeric films, such as low tensile set, low modulus, and high elongation, but each also has shortcomings. A primary shortcoming of many of these compositions is the inability to form a film by an extrusion-blowing process. Although other film forming processes, such as extrusion casting, solvent casting and calendering, are acceptable for many purposes, extrusion blowing is preferred for other applications. Extrusion will orientate polymer molecules in the extrusion direction and will cause tensile property loss in the direction transverse to the extrusion. Because blowing stretches the film in the direction transverse to the extruder, film produced by extrusion blowing has a superior directional balance of properties.

Elastomeric block copolymers, usually of vinyl arenes and conjugated dienes, may be used in elastomeric film. But these block copolymers which can be extrusion blown have melt processing temperatures which are too high for commercial extrusion blowers, and too high for commercially available antiblocking, antioxidant and stabilizer additives. The resultant extrusion blown film is therefore darkened and has a burned odor. Lower molecular weight block copolymers of vinyl arenes and conjugated dienes have melt temperatures which are acceptable for extrusion blowing, but may not be blown to an acceptably thin film. Tabana, in U.S. Pat. No. 4,017,436, discloses a composition of elastomeric block copolymer, liquid polybutadiene and tackifier which has film forming qualities superior to the elastomeric block copolymer alone. But the disclosed unhydrogenated block copolymer and unhydrogenated liquid polybutadiene would cause oxidative instability, thermal instability and intolerance to U.V. light which would result in unacceptably short shelf lives for many of the end uses of elastomeric films.

Elastomeric films containing thermoplastic urethanes, copolyesters and/or ethylene-vinyl acetate copolymers are expensive due to the cost of the raw materials. Films of these materials are also not as "soft" as would be desired for many applications. Items which are worn against the skin such as medical drainage apparatus, gloves and diapers would be preferably made from compositions which have a softer feel. The tensile set and modulus of films made of these materials are acceptable for many applications, but advantages would be realized from using a material with a lower tensile set and a lower modulus (a measurement of softness).

Compositions of a single vinyl arene-conjugated diene block copolymer, polystyrene and non-aromatic extender oil have been unsuccessfully tested by Applicants as extrusion blown elastomeric films. The block copolymers have such a high melt temperature that processing the compositions in commercial extruder-blowers with commercial additives, such as antiblocking agents and stabilizers, resulted in a discolored film with a smoky odor. Adding non-aromatic extender oil, adding polystyrene, and lowering the molecular weight of the block copolymer all could result in lower melt temperatures. Of these other methods of lowering melt temperature which were tested, however, none were found to result in a composition which could be extrusion blown.

It is therefore an object of this invention to provide a composition which is capable of extrusion blowing to a film of one to five mils in thickness, has high elongation, elastic recovery, and a low modulus. In another aspect, it is an object of this invention to provide an extrusion blown elastomeric film which has excellent elongation, has excellent elastic recovery, and has a low modulus. In an additional aspect, it is an object of this invention to provide a process for producing an elastomeric film which has an excellent elongation, has excellent elastic recovery, and has a low modulus.

SUMMARY OF THE INVENTION

The invention composition comprises: a first hydrogenated block copolymer of at least two A blocks comprising predominantly alkenyl arene monomer units, and at least one B block which is predominantly conjugated diene monomer units and has a molecular weight between about 55,000 and about 200,000; a second hydrogenated block copolymer of at least two A blocks comprising predominantly alkenyl arene monomer units, and at least one B block which is predominantly made of conjugated diene monomer units and has a molecular weight between about 15,000 and about 85,000, the ratio of the molecular weight of the first hydrogenated block copolymer to the second hydrogenated block copolymer being greater than about 1.1:1, the amount of each of the first and second block copolymer being at least 15 parts by weight, and the amount of the first plus second block copolymer adding up to 100 parts by weight; from about 5 to about 200 parts by weight of a non-aromatic processing oil based on 100 parts by weight of hydrogenated block copolymer; and from about 5 to about 100 parts by weight of a polymer which is compatible with the A blocks of the block copolymer based on 100 parts by weight of hydrogenated block copolymers.

The elastomeric films of this invention are films of about one to five mils in thickness and are preferably produced by extrusion blowing the composition described above using extrusion blowing equipment, conditions and techniques known in the art.

The process for producing an elastomeric film of this invention comprises the steps of providing a polymeric composition as described above; extruding the polymeric composition through a die, the die having a gap greater than about 5 mils and less than about 120 mils; expanding the extruded film to a thickness of between about 0.5 mils and about 10 mils by application of differential pressure by a gas; and rapidly cooling the expanded extruded film.

DETAILED DESCRIPTION OF THE INVENTION

The hydrogenated block copolymers of this invention have at least two alkenyl arene polymer blocks A, which may be selected independently and at least one elastomeric conjugated diene polymer block B. A preferred structure of the block copolymer is $(A-B)_n-A$ where n is an integer of 1 to 20.

Blocks A and B may be either homopolymer, random or tapered copolymer blocks as long as each block is predominantly the class of the monomer characterizing the block. For example, the block copolymer may contain A blocks which are styrene/alpha-methylstyrene copolymer blocks or styrene/butadiene random or tapered copolymer blocks as long as the blocks individually predominate in alkenyl arenes. The A blocks are preferably monoalkenyl arene homopolymer blocks. The term "monoalkenyl arene" will be taken to include particularly those of the benzene series such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred monoalkenyl arenes are monovinyl monocyclic arenes such as styrene and alpha-methylstyrene, and styrene is particularly preferred.

By predominantly being the class of the monomer characterizing the block, it is meant that more than about 75% by weight of the A blocks are alkenyl arene monomer units, and more than about 75% by weight of the B blocks are conjugated diene monomer units.

The blocks B may comprise homopolymers of conjugated diene monomers, copolymers of two or more conjugated dienes, and copolymers of one or more of the dienes with a monoalkenyl arene as long as the blocks B are predominantly conjugated diene units. The conjugated dienes preferably contain from 4 to 8 carbon atoms. Examples of such suitable conjugated diene monomers include: 1,3-butadiene (butadiene), 2-methyl-1,3-butadiene (isoprene), 2,3-dimethyl-1,3-butadiene, 1,3-pentadiene (piperylene), 1,3-hexadiene, and the like.

Preferably, the block copolymers of conjugated dienes and alkenyl arene hydrocarbons which may be utilized include those butadiene derived elastomers which have 1,2-microstructure contents prior to hydrogenation of from about 7 to about 100 percent, more preferably from about 25 to about 65 percent, and most preferably from about 35 to about 55 percent. The proportion of the copolymer which is alkenyl arene monomer units is between about 1 and about 60 percent by weight of the block copolymer, preferably between about 5 and about 50 percent, more preferably between about 15 and about 45 percent by weight and most preferably between about 20 and about 40 percent by weight.

The block copolymers may be produced by any block polymerization or copolymerization procedures including the well known sequential addition of monomer technique, incremental addition of monomer technique or coupling technique as illustrated in, for example, U.S. Pat. Nos. 3,251,905; 3,390,207; 3,598,887 and 4,219,627, which are incorporated herein by reference. As is well known in the block copolymer art, tapered copolymer blocks can be incorporated in the multiblock copolymer by copolymerizing a mixture of conjugated diene and alkenyl arene monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356, which are incorporated herein by reference.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

These copolymers are preferably hydrogenated to increase their thermal stability and resistance to oxidation. The hydrogenation of these copolymers may be carried out by a variety of well established processes including hydrogenation in the presence of such catalysts as Raney Nickel, noble metals such as platinum, palladium and the like, and soluble transition metal catalysts. Suitable hydrogenation processes which can be used are ones wherein the copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, which are incorporated herein by reference. The copolymers are hydrogenated in such a manner as to produce hydrogenated copolymers having a residual ethylenic unsaturation content in the polydiene block of not more than about 20 percent, preferably not more than about 10 percent, most preferably not more than about 5 percent, of their original ethylenic unsaturation content prior to hydrogenation.

The first and the second block copolymer may differ from the other in any of the above respects, but must differ from each other in respect to molecular weights. The first block copolymer of the present invention has a high molecular weight and is necessary to lend acceptable film blowing ability to the composition. The number average molecular weight of the first block copolymer may be between about 55,000 and about 200,000 is preferably between 60,000 and about 110,000 and is most preferably between about 61,000 and about 90,000.

Molecular weights of the hydrogenated block copolymers of the present invention are preferably measured by gel permeation chomatography with a polystyrene standard. The second block copolymer of the present invention has a lower molecular weight than the first, and has been found to lower the melt temperatures and improve processability of the composition. But as opposed to other methods of lowering the melt temperatures, adding a lower molecular weight block copolymer was found to be significantly less detrimental to film forming ability. The number average molecular weight of the second block copolymer may be between about 15,000 and about 85,000, preferably between about 30,000 and 60,000, and is most preferably between about 40,000 and about 60,000.

Additionally, the ratio of the molecular weight of the first block copolymer to the second block copolymer must be greater than 1.1:1.

Each of the block copolymers of the present invention is present in an amount of about 15 to about 85 parts by weight, preferably an amount of about 30 to about 70 parts weight, most preferably an amount of about 40 to about 60 parts by weight, based on 100 parts by weight of total block copolymer.

The amount of the block A compatible polymer of the invention composition is between about 5 and about 100 parts by weight, preferably between about 10 and about 35 parts by weight, most preferably between about 15 and 25 parts by weight based on 100 parts of the sum of the amount of the two block copolymers.

Compatibility, as it is used herein to describe the polymer which is compatible with the block A's is defined as the polymeric materials being at least partially miscible. The miscibility of a polymer with the block A's is typically detected by the effect of the presence of the polymer on the glass transition temperature of the A block. A blend of a polymer which is completely miscible with the A block and the block copolymer will result in a blend that has two glass transition temperatures; a B block glass transition temperature, and a glass transition temperature between the original A block glass transition temperature and the glass transition temperature of the completely miscible polymer. A blend of a partially miscible polymer and the block copolymer will have three glass transition temperatures; a B block glass transition temperature, a glass transition temperature of the partially miscible polymer and a glass transition temperature between the original A block glass transition temperature and the glass transition temperature of the partially miscible polymer. The glass transition temperature of the A blocks would have shifted from its original temperature toward the glass transition temperature of the partially miscible polymer. This shift does not have to be large to indicate sufficient miscibility to satisfy the "compatibility" requirement of the block A compatible polymer of this invention. Existing methods of measuring glass transition temperatures are not precise enough to detect a shift in the A block glass transition temperature which would indicate sufficient miscibility. Any polymer which, when blended with the block copolymer of the present invention causes a measurable shift in the glass transition temperature of the block A's is therefore compatible with the block A's within the meaning of that term used herein. In addition, polymers with structures similar to the structures of the block A's would be expected to be at least partially miscible with the A blocks and are therefore considered to be "compatible" even if a shift in the block A glass transition temperature cannot be detected. Structurally similar polymers include polymers which are predominantly polymerized arenes, and polyphenylene ethers.

Polymers which are known to not be compatible with the A blocks of the present invention include polymers which are predominantly polymerized conjugated dienes, polymerized ethylene, polymerized alpha olefins and combinations thereof. High impact polystyrenes, which are polystyrenes with polybutadiene polymer arms grafted along the polystyrene chain having molecular weights of from about 80,000 to about 250,000 are noncompatible with block A's of the present invention, as are commercially available styrene-butadiene rubbers (SBR) and styrene-butadiene block copolymers which have styrene contents less than about 70% by weight.

The block A compatible polymer of the invention composition is preferably a polymer which is predominantly polymerized monomer units of an alkenyl arene, or combinations of different alkenyl arenes. Most preferably, the A block compatible polymer is polystyrene.

The block A compatible polymer preferably has a 100 poise viscosity at a temperature between about 130° C. and about 340° C. Most preferably, the block A compatible polymer has a 100 poise viscosity at a temperature between about 160 and about 310° C.

The non-aromatic processing oil component of the invention composition preferably contains less than about 10% by weight aromatics as determined by clay-gel analysis. Acceptable softening oils are also referred to in the industry as softening oils, mineral oils, and extender oils. These oils are commonly incorporated in rubber compositions to decrease the cost of the composition and to lower the modulus of the composition. Non-aromatic processing oils of the present invention will preferably have a flash temperature between 170° C. and 300° C. and dynamic viscosity at 37.8° C. of about 20 to 500 cst.

Synthetic extender oils, such as low molecular weight liquid polybutadiene, may also be used as the non-aromatic processing oil.

The amount of non-aromatic processing oil required is from about 5 to about 200, preferably between about 20 and about 70 parts by weight and most preferably between about 30 and about 60 parts by weight per 100 parts by weight of the sum of the two block copolymers.

The composition of the present invention may also optionally include other components such as pigments, stabilizers, antioxidants, and antiblocking agents. Such components are known to those skilled in the art. The pigments, stabilizers, antioxidants and antiblocking agents are preferably present in an amount between about 1 and about 10 parts by weight per 100 parts by weight of the sum of the amount of the first hydrogenated block copolymer and the second hydrogenated block copolymer.

The elastic film composition of the present invention may be manufactured using polymer blending techniques currently practiced in the art, such as batch and continuous mixing methods employing mixing equipment like Banbury batch mixers, Farrell continuous mixers and twin-screw extruders. Well mixed compositions are obtainable when mixing is carried out at a melt temperature in the range between about 390 to about 450° F. Films blown with inadequately mixed compositions usually would show a high intensity of gels or a fish eye appearance as well as a tendency to block.

Extrusion blown films may be prepared from the compositions of this invention using standard equipment, standard techniques and typical conditions. A polyolefin type extruder screw is preferred, but other designs are also acceptable. A die gap of about 5 to about 120 mils is acceptable, a gap of about 10 to about 80 mils is preferred, and a gap of about 20 to about 40 mils is most preferred. Die temperatures of about 390° F. to about 450° F. are acceptable and between about 400° F and 440° F are preferred. A blow up ratio of 2 to 1 is preferred. Rapid cooling of the extruder blown film is preferably performed by a dual lip cooling ring. Due to the low modulus of the film produced from the composition of this invention, a rollered collapsing frame is preferred to avoid bubble chatter.

A film which is extrusion blown from the composition of this invention is between about 0.5 and 10 mils in thickness, and is preferably between about 1.0 and about 6 mils in thickness and is most preferably between about 1.0 and 5 mils in thickness.

A 2.5 mil film can be extrusion blown from the composition of the present invention using a 2.5 inch extruder with a 10 inch die and a 0.025 inch die gap and 20/80/200/80/20 screens. The extrusion can be at a pressure of 2800 psi and at the rate of 80 fpm. A screw speed 50 rpm, a die temperature of 420° F., and a blow out ratio of 1.2 to 1 are acceptable.

The composition of this invention may be extruder blown to a film with a low modulus, and excellent tensile strength and high ultimate elongation in both machine and transverse directions, high blow out ratios, low permanent set and high recoverable energy. This composition is also made of less expensive components than alternative elastomeric film compositions. Films having 100% modulus of less than bout 170 psi in both the machine and transverse directions are obtainable, and blow up ratios of up to 6:1 are obtainable with the composition of this invention. Films made from the composition of this invention have recoverable energy of greater than about 80% and permanent sets of about 9% and less.

EXAMPLES

The low molecular weight hydrogenated block copolymer used in the following examples was a hydrogenated styrene-butadiene-styrene block copolymer with a total molecular weight of 49700 as measured by GPC with a polystyrene standard and about 30% by weight polystyrene endblocks. The 1,2-microstructure content of the midblock segment prior to hydrogenation is about 40%. Hydrogenation had saturated more than 95% of the original midblock ethylenic unsaturation.

The high molecular weight block copolymer was also a hydrogenated styrene-butadiene styrene block copolymer. The high molecular weight block copolymer had about 32% by weight of polystyrene endblocks and a total molecular weight of 68000 measured by GPC with a polystyrene standard. The 1,2-microstructure content of the midblock segment prior to hydrogenation was about 40%, and hydrogenation had saturated more than 95% of the original midblock ethylenic unsaturation.

The endblock compatible resin employed in this invention was a high-softening-point pure monomer hydrocarbon resin derived from a styrene monomer, Piccolastic D150. This resin was manufactured by Hercules Inc.. The resin has a ring ball softening point of about 146 ° C and a melt viscosity of 100 poises at about 245° C.

A non-aromatic processing oil, Penreco 4434 oil, manufactured by Pennzoil Company was employed in this invention. The processing oil exhibits the following typical properties: viscosity by ASTM D-445 at 100° F of 370 to 410 SUS; specific gravity of 0.864 to 0.878 at 60° F; and flash point by ASTM D-92 of about 460° F.

Additives are included in the following examples and comparative examples include a heat stabilizer, an antiblocking agent and a slip agent to improve stability of the composition and limit the blocking tendency of the blown films. The additive package employed in this invention contains, based on 100 parts weight of total hydrogenated block copolymers, 1 part of Irganox 1010 heat stabilizer sold by Ciba Geigy Corp., Hawthorne, N.Y., 0.5 parts of 3,3-dilaurylthiodipropionate heat stabilizer, 1 part of Adogen 58, sold by Sherex Chem. Corp., Dublin, Ohio, as slip agent and 5 parts of Superfloss, sold by Manville Corp., Atlanta, Georgia as antiblocking agent.

The melt index of the blend compositions was determined according to ASTM Method D-1238, condition G. Tests were conducted using a 5 kilogram plunger weight and measurements were carried out at 200 degree C.

The ultimate tensile strength and elongation were determined according to ASTM D-882-81 method using an Instron Model 1122 tester. The properties of the film were measured in the direction of extrusion of the film (machine direction, MD); and in the direction perpendicular to the direction of extrusion (cross-machine direction, CD).

To determine permanent set, a specimen was prepared according to ASTM D-882-81. Test specimens were cut along the direction of extrusion of the film (MD). An Instron Model 1122 tester was used to subject the specimens to maximum extension of 150% strain and then relaxation at the same rate as the extension until the specimen was in the relaxed state (near zero force). Subsequently another loading cycle was imposed. The length at which the specimen reaches its relaxed state in the unloading cycle was measured and the permanent set was then calculated according to the following equation:

$$\text{Permanent set} = 100\% \times \frac{(\text{length at relaxed state} - \text{original length})}{(\text{length at max extension} - \text{original length})}$$

The recoverable energy is the ratio of the energy released during the unloading cycle to the energy stored during the loading cycle.

The blow-out ratio of blown films is calculated as the ratio of the total lay flat width of the blown film to the circumference of the inner-circle of the film die.

Comparative Example 1 was prepared by mixing 100 parts of the high molecular weight hydrogenated block copolymers with other ingredients as shown in Table I with a twin-screw extruder (diameter=0.8", screw length to diameter ratio, L/d, of 20:1). The elastic films were obtained by blown film process using a 0.75" diameter single screw Brabender extruder equipped with a 2" diameter film die and 0.020" die gap. Thin gage (2-5 mils) films were obtained at greater than 460° F. melt temperatures. Film blowing was not successful if the melt temperature was reduced to the range from 390 to 430° F.

A thin gage blown film was produced on a larger scale on a blown film line using a 2.5" diameter single screw extruder and 10-inch die with a die gap of 0.035". A 2-5 mils thick films were obtained when extrusion blowing was conducted at 460° F. melt temperature, but the extrusion caused intense smoke and odors. Film forming was not successful when the melt temperature was reduced to less than 430° F.

It can be seen from this comparative example that an elastic film composition comprising high molecular weight hydrogenated block polymer is deficient as a blown film composition because of the high melt temperature required. The high melt temperature generated smoke and fumes.

Comparative Example 2 was prepared by blending 100 parts weight of low molecular weight hydrogenated block copolymer with other ingredients as shown in Table I in the manner described for Comparative Example 1. Attempts to prepare blown films 1 to 5 mils thick with the process described in Comparative Example 1 were not successful. Melt temperature ranging from 385 to 450° F. were utilized without success. This comparative example demonstrates that it is not feasible to formulate blown film composition containing only a low molecular weight hydrogenated block copolymer.

Example 1 was prepared by blending 50 parts by weight of high molecular weight hydrogenated block copolymers and 50 parts by weight of low molecular weight hydrogenated block copolymer with other ingredients as shown in Table I. The compound and the blown film were obtained in the same manner as described for Comparative Example I. Films 2-5 mils thick could be formed at 390 to 410° F. melt temperature. Properties of the film are included in Table I. The film so produced exhibited good elastic recovery and mechanical strength, as is indicated by the properties included in Table 1.

Examples 2, 3 and 4 contain varying ratio of high and low molecular weight hydrogenated block copolymers and were blended as described for Comparative Example 1. The compositions are shown in Table I. The ratios of high and low molecular weight hydrogenated block copolymers are 60/40, 40/60 and 70/30 for Examples 2, 3 and 4 respectively. Thin gage films were successfully blown at 390 to 420° F. melt temperatures. Physical properties of the blown films are included in Table I.

Example 2 was also employed in a larger scale film forming run as described for Comparative Example 1. Thin elastic films were obtained at extruder melt temperatures ranging from 390 to 420° F in the absence of smoke and odor.

TABLE I

|  | Comparative Examples | | Examples | | | |
| --- | --- | --- | --- | --- | --- | --- |
|  | 1 | 2 | 1 | 2 | 3 | 4 |
| Composition, Part Weight | | | | | | |
| High Mw Block Copolymer | 100 | — | 50 | 60 | 40 | 70 |
| Low Mw Block Copolymer | — | 100 | 50 | 40 | 60 | 30 |
| Piccolastic D150 | 20 | 20 | 20 | 20 | 20 | 20 |
| Process oil, Penreco 4434 | 40 | 45 | 45 | 45 | 45 | 45 |
| Additive package | 7.5 | 7.5 | 7.5 | 7.5 | 7.5 | 7.5 |
| Film Blowing | | | | | | |
| Melt temperature, °F. | 497 | 420 | 410 | 420 | 395 | 433 |
| Lay-flat width, inch | 5.75 | — | 4.75 | 6 | 4.75 | 5.75 |
| Blow-out ratio (BUR) | 1.83 | — | 1.5 | 1.9 | 1.5 | 1.8 |
| Film Thickness, mils | 4 | — | 3 | 4 | 3 | 3 |
| Physical Properties | | | | | | |
| Melt index, gm/10 min | 3 | 61 | 28 | 12 | 19 | 9 |
| Tensile Strength, psi | | | | | | |
| Machine direction | 2057 | — | 970 | 1380 | 1200 | 1570 |
| Transverse direction | 2072 | — | 1230 | 1560 | 1350 | 1610 |
| Ultimate elongation, % | | | | | | |
| Machine direction | 770 | — | 590 | 670 | 590 | 750 |
| Transverse direction | 740 | — | 620 | 680 | 620 | 670 |
| 100% modules, psi | | | | | | |
| Machine direction | 176 | — | 120 | 150 | 170 | 170 |
| Transverse direction | 134 | — | 130 | 140 | 140 | 130 |
| After 150% extension cyclic test, MD, | | | | | | |
| Permanent set, % | 8.2 | — | 8.1 | 8.9 | 8.9 | 7.1 |
| Recoverable energy, % | 78 | — | 86 | 86 | 82 | 82 |

We claim:

1. A polymeric composition capable of being extrusion blown to form an elastomeric film having a thickness of from 1 to 5 mils, the polymeric composition comprising:
   (a) from about 15 to about 85 parts by weight of a first hydrogenated block copolymer comprising:
      (i) at least two blocks A which are predominantly polymerized alkenyl arene, and
      (ii) at least one block B which is predominantly polymerized conjugated diene wherein the first hydrogenated block copolymer comprises from about 1 to about 60 percent by weight polymerized alkenyl arene, has a number average molecular weight within the range of about 60,000 to about 110,000, and has no more than 20% residual ethylenic unsaturation in the conjugated diene block;
   (b) an amount of a second hydrogenated block copolymer such that the amount of the first hydrogenated block copolymer plus the amount of the second hydrogenated block copolymer is 100 parts by weight, the second hydrogenated block copolymer comprising:
      (i) at least two blocks A, which are predominantly polymerized alkenyl arene, and
      (ii) at least one block B, which is predominantly polymerized conjugated diene wherein the second hydrogenated block copolymer comprises from about 1 to about 60 percent by weight polymerized alkenyl arene, has a number average molecular weight within the range of about 30,000 to about 60,000, and has not more than about 20% residual ethylenic unsaturation of the conjugated diene block; and the ratio of the molecular weight of the first hydrogenated block copolymer to the ratio of the molecular weight of the second hydrogenated block copolymer is greater than 1.1:1;
   (c) from about 5 to about 200 parts by weight per 100 parts by weight of the first plus the second block copolymer of a non-aromatic processing oil; and
   (d) from about 5 to about 100 parts by weight per 100 parts by weight of the first plus the second block copolymer of a polymer which is compatible with each of the A blocks of the hydrogenated block copolymers.

2. The composition of claim 1 wherein the polymerized alkenyl arene is polystyrene.

3. The composition of claim 1 wherein the conjugated diene is selected from the group consisting of butadiene, isoprene and mixtures thereof.

4. The composition of claim 1 wherein the number average molecular weight of the first hydrogenated block copolymer is betweeen about 61,000 and about 90,000.

5. The composition of claim 4 wherein the number average molecular weight of the second hydrogenated block copolymer is between about 40,000 and 60,000.

6. The composition of claim 1 wherein the first hydrogenated block copolymer is present in an amount between about 30 and about 70 parts by weight based on 100 parts by weight of the amount of the first plus the amount of the second block copolymer.

7. The composition of claim 1 wherein the polymer which is compatible with the A blocks is present in an amount of between about 10 and about 35 parts by weight per 100 parts by weight of the first plus the second block copolymer.

8. The composition of claim 1 wherein the block A compatible polymer is polystyrene.

9. The composition of claim 1 wherein the block A compatible polymer has a 100 poise viscosity at a temperature between about 160° C. and about 310° C.

10. The composition of claim 1 wherein the non-aromatic extending oil is present in an amount of between about 20 and about 70 parts by weight per 100 parts by weight of hydrogenated block copolymer.

11. The composition of claim 1 further comprising from 1 to 10 parts by weight stabilizer additives per 100 parts by weight of the amount of the first plus the amount of the second hydrogenated block copolymer.

12. A polymeric composition capable of being extrusion blown to form an elastomeric film having a thickness of from 1 to 5 mils, the composition consisting essentially of:
    (a) from about 15 to about 85 parts by weight of a first hydrogenated block copolymer comprising:
        (i) at least two blocks A which are predominantly polymerized alkenyl arene, and
        (ii) at least one block B which is predominantly polymerized conjugated diene wherein the first hydrogenated block copolymer comprises from about 1 to about 60 percent by weight polymerized alkenyl arene, has a number average molecular weight within the range of about 60,000 to about 110,000, and has no more than 20 percent residual ethylenic unsaturation in the conjugated diene block;
    (b) an amount of a second hydrogenated block copolymer such that the amount of the first hydrogenated block copolymer plus the amount of the second hydrogenated block copolymer is 100 parts by weight, the second hydrogenated block copolymer comprising:
        (i) at least two blocks A, which are predominantly polymerized alkenyl arene, and
        (ii) at least one block B, which is predominantly polymerized conjugated diene wherein the second hydrogenated block copolymer comprises from about 1 to about 60 percent by weight polymerized alkenyl arene, has a number average molecular weight within the range of about 30,000 to about 60,000 and has not more than about 20 percent residual ethylenic unsaturation of the conjugated diene block; and the ratio of the molecular weight of the first hydrogenated block copolymer to the ratio of the mmolecular weight of the second hydrogenated block copolymer is greater than 1.1:1;
    (c) from about 5 to about 200 parts by weight per 100 parts by weight of the first plus the second block copolymer of a non-aromatic processing oil;
    (d) from about 5 to about 100 parts by weight per 100 parts by weight of the first plus the second block copolymer of a polymer which is compatible with each of the A blocks of the hydrogenated block copolymers; and
    (e) from 0 to about 10 parts by weight of components selected from the group consisting of stabilizers, pigments, slip agents, antioxidants, antiblocking agents and mixtures thereof.

13. The composition of claim 12 wherein the non-aromatic extending oil is present in an amount of between about 20 and about 70 parts by weight.

14. The composition of claim 12 wherein the block A compatible polymer is polystyrene.

15. The composition of claim 14 wherein the polystyrene is present in an amount of between about 10 and about 35 parts by weight.

* * * * *